(12) United States Patent
Talsma et al.

(10) Patent No.: US 10,827,685 B2
(45) Date of Patent: Nov. 10, 2020

(54) HYDRAULIC BRAKE FOR WRAP MATERIAL

(71) Applicant: Vermeer Manufacturing Company, Pella, IA (US)

(72) Inventors: Steven D. Talsma, Pella, IA (US); Ty Hartwick, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 233 days.

(21) Appl. No.: 16/056,061

(22) Filed: Aug. 6, 2018

(65) Prior Publication Data
US 2019/0045717 A1 Feb. 14, 2019

Related U.S. Application Data

(60) Provisional application No. 62/547,598, filed on Aug. 18, 2017, provisional application No. 62/544,549, filed on Aug. 11, 2017.

(51) Int. Cl.
*A01F 15/07* (2006.01)
(52) U.S. Cl.
CPC .... *A01F 15/0715* (2013.01); *A01F 2015/072* (2013.01); *A01F 2015/076* (2013.01)
(58) Field of Classification Search
CPC ............ A01F 15/0715; A01F 2015/072; A01F 2015/076; B65H 23/063; B65H 59/381; B65H 75/242; B65H 75/245; B65B 11/04; B65B 2011/002; B65B 41/12; B65B 41/16
USPC ............ 53/556, 587, 210, 211, 389.2, 389.4, 53/389.5; 242/422.2
See application file for complete search history.

(56) References Cited

U.S. PATENT DOCUMENTS

| 2,636,693 A | * | 4/1953 | Littell et al. | B21C 47/30 |
| | | | | 242/421.4 |
| 2,733,022 A | * | 1/1956 | Grody | B65H 75/245 |
| | | | | 242/571.8 |
| 2,903,200 A | * | 9/1959 | McDougall et al. | |
| | | | | B65H 75/245 |
| | | | | 242/571.8 |
| 3,243,138 A | * | 3/1966 | Nilsson | B65H 23/063 |
| | | | | 242/413.2 |

(Continued)

FOREIGN PATENT DOCUMENTS

| CA | 2864255 A1 | | 8/2013 | |
| DE | 2142946 A1 | * | 3/1973 | ......... B65H 23/1888 |

(Continued)

OTHER PUBLICATIONS

European Search Report for Application No. 18188209.3, dated Nov. 28, 2018 (7 pgs).

*Primary Examiner* — Stephen F. Gerrity
(74) *Attorney, Agent, or Firm* — Armstrong Teasdale LLP

(57) ABSTRACT

A bale wrap tensioning system includes a spindle that can be operatively coupled to a wrap material supply roll and a rotary hydraulic device that has a rotatable input shaft. The input shaft is coupled to the spindle for rotation with the wrap material supply roll. The bale wrap tensioning system includes a control valve that is operable to control a variable pressure of hydraulic fluid displaced by the rotary hydraulic device. The bale wrap tensioning system includes a controller for adjusting the control valve to alter the variable pressure of the hydraulic fluid displaced by the rotary hydraulic device.

22 Claims, 11 Drawing Sheets

(56) References Cited

U.S. PATENT DOCUMENTS

| | | | | |
|---|---|---|---|---|
| 3,558,074 A | * | 1/1971 | Held | B65H 23/063 |
| | | | | 242/418 |
| 3,934,836 A | * | 1/1976 | Dunlap et al. | B23B 31/4006 |
| | | | | 242/573.7 |
| 3,936,008 A | * | 2/1976 | Crum | B65H 23/063 |
| | | | | 242/421.1 |
| 4,508,281 A | * | 4/1985 | Plater | B65H 59/381 |
| | | | | 242/390.6 |
| 4,565,334 A | * | 1/1986 | Ruhl | B65H 75/245 |
| | | | | 242/587.2 |
| 5,123,605 A | * | 6/1992 | Hehner et al. | B65H 23/063 |
| | | | | 242/421.4 |
| 5,467,934 A | * | 11/1995 | del Mar Segura Salvador et al. | B65B 11/04 |
| | | | | 53/441 |
| 5,979,146 A | * | 11/1999 | Orpen et al. | B65H 59/381 |
| | | | | 242/390.6 |
| 7,181,900 B2 | | 2/2007 | Hood et al. | |
| 7,908,822 B2 | | 3/2011 | McClure | |
| 2005/0109007 A1 | | 5/2005 | William et al. | |
| 2012/0073455 A1 | | 3/2012 | Vandamme | |
| 2016/0183474 A1 | | 6/2016 | Thoreson et al. | |

FOREIGN PATENT DOCUMENTS

| | | | | |
|---|---|---|---|---|
| DE | 3729358 A1 | * | 3/1989 | B65H 18/04 |
| DE | 202016000568 U1 | | 6/2017 | |
| EP | 0242975 A2 | | 10/1987 | |
| EP | 2119343 A2 | | 11/2009 | |
| GB | 1546523 A | | 5/1979 | |
| JP | 01084809 A | * | 3/1989 | B65B 11/04 |
| WO | WO-2012034460 A1 | * | 3/2012 | B65H 75/4484 |
| WO | 2015035375 A1 | | 3/2015 | |

* cited by examiner

HYDRAULIC BRAKE FOR WRAP MATERIAL

CROSS-REFERENCE TO RELATED APPLICATIONS

This application claims benefit of U.S. Provisional Patent Application Nos. 62/547,598, filed Aug. 18, 2017; and 62/544,549, filed Aug. 11, 2017, which applications are hereby incorporated by reference in their entireties.

BACKGROUND

Round balers have become an integral part of the agricultural industry and a variety of different types of balers are currently in use. In some examples, balers use a system of belts or a fixed chamber that compresses a crop material to form a bale. Common to all balers is the need to wrap the finished round bale with a wrap material that secures the bale. After the crop material has been picked up by the baler and a bale is completely formed in the chamber, the bale is then typically wrapped with a wrap material to keep the bale intact and protected. After the wrapping is completed, the bale is ejected from the baling chamber and is later picked up for storage or use.

As the wrap material is applied to the bale, proper wrap material tension is important. If overly taught, the wrap material can fail during a bale wrapping process or can be easily broken during bale handling. If too loose, the wrap material will perform poorly at keeping the bale intact. Therefore, improvements in managing wrap material tension during application are needed.

SUMMARY

One aspect of the present disclosure relates to a braking system for a wrap system in a round baler. In one possible configuration, and by non-limiting example, a hydraulic braking system is utilized in which the amount of brake tension applied to a wrap material roll can be varied.

In one aspect of the present disclosure, a bale wrap tensioning system is disclosed. The bale wrap tensioning system includes a spindle that can be operatively coupled to a wrap material supply roll and a rotary hydraulic device that has a rotatable input shaft. The input shaft is coupled to the spindle for rotation with the wrap material supply roll. The bale wrap tensioning system includes a control valve that is operable to control a variable pressure of hydraulic fluid displaced by the rotary hydraulic device. The bale wrap tensioning system includes a controller for adjusting the control valve to alter the variable pressure of the hydraulic fluid displaced by the rotary hydraulic device.

In another aspect of the present disclosure, a bale wrap tensioning system is disclosed. The bale wrap tensioning system includes a spindle that can be operatively coupled to a wrap material supply roll. The spindle includes a spindle longitudinal axis. The bale wrap tensioning system includes a rotary hydraulic device that has a rotatable input shaft. The input shaft is coupled to the spindle for rotation with the wrap material supply roll, and the input shaft includes an input shaft longitudinal axis. The input shaft longitudinal axis and the spindle longitudinal axis are co-axially aligned. The bale wrap tensioning system includes a control valve positioned downstream from the rotary hydraulic device. The control valve has the capability control a variable pressure of hydraulic fluid displaced by the rotary hydraulic device. The bale wrap tensioning system includes a controller for automatically adjusting the control valve to alter the hydraulic pressure to provide a braking response to the spindle.

In another aspect of the present disclosure, a bale wrap tensioning system is disclosed. The bale wrap tensioning system includes a spindle that can be operatively coupled to a wrap material supply roll. The spindle includes a spindle longitudinal axis. The bale wrap tensioning system includes a rotary hydraulic device having a fixed displacement between about 25 cubic inches and about 40 cubic inches. The rotary hydraulic device includes a rotatable input shaft coupled to the spindle for rotation with the wrap material supply roll. The bale wrap tensioning system includes a control valve positioned downstream from the rotary hydraulic device. The control valve is a proportional pressure relief valve that has a pressure setting used to control a variable pressure of hydraulic fluid displaced by the rotary hydraulic device. The bale wrap tensioning system includes a controller for automatically adjusting the pressure setting of the control valve to provide a braking response to the spindle.

In another aspect of the present disclosure, a bale wrap tensioning system is disclosed. The bale wrap tensioning system includes a rotary hydraulic device that has a rotatable input shaft. The bale wrap tensioning system includes an extension coupled to the input shaft of the rotary hydraulic device. The extension includes a compressible portion that is selectively expandable to fix the extension to a bale wrap material roll.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
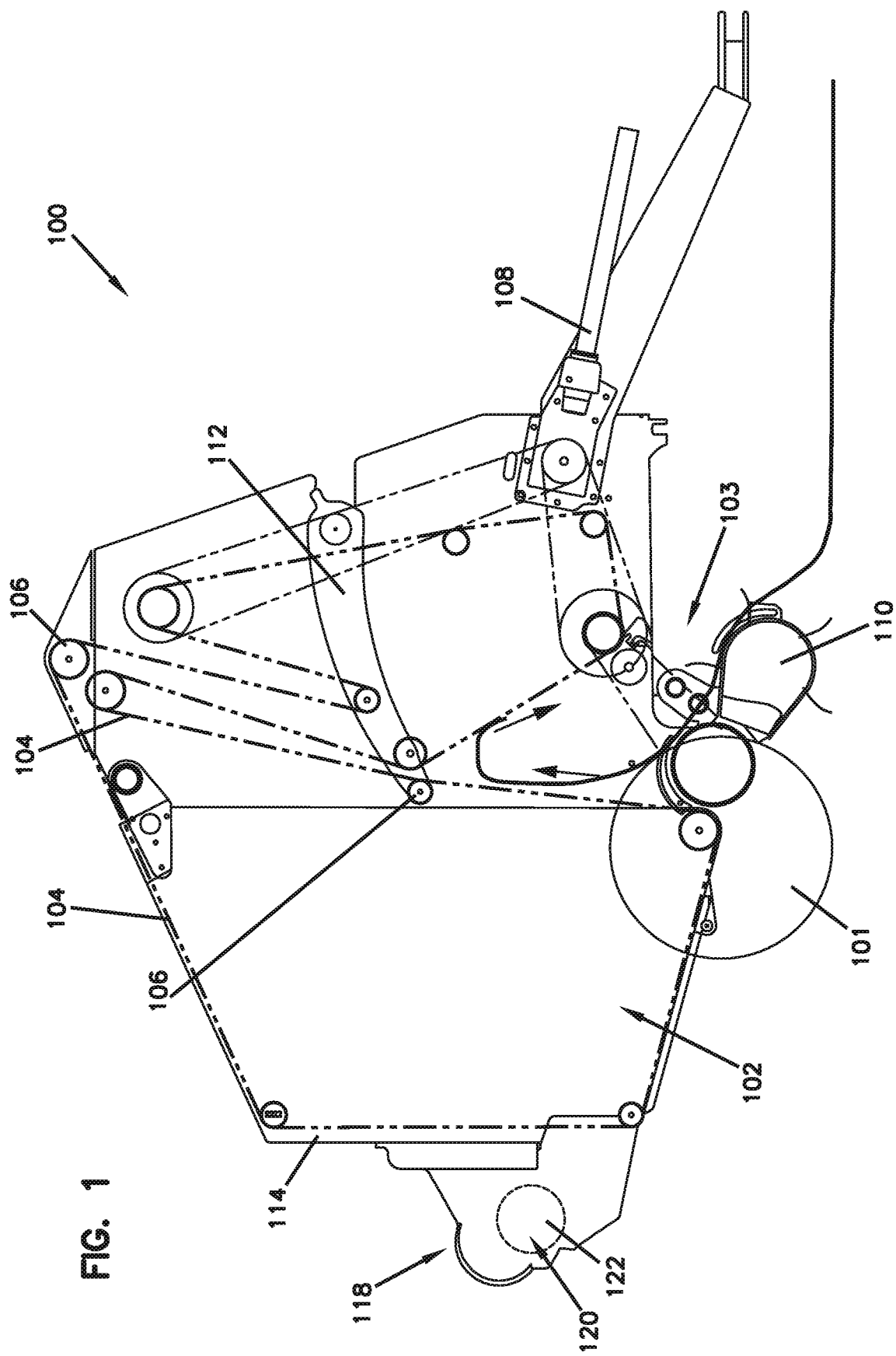
FIG. 1 is a schematic side view of an empty round baler, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
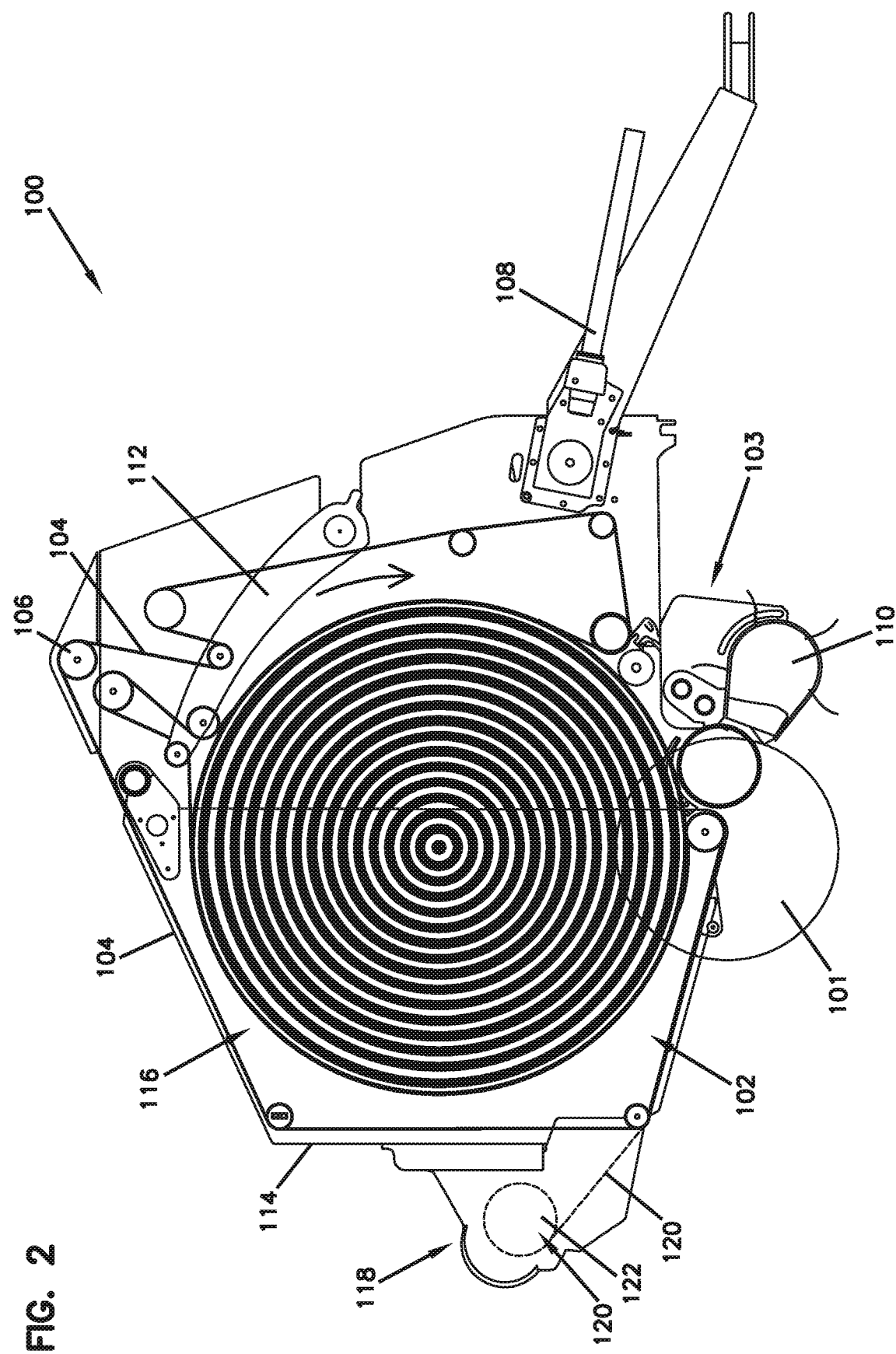
FIG. 2 is a schematic side view of the round baler of FIG. 1 with a full-sized bale positioned therein.
Figure 3:
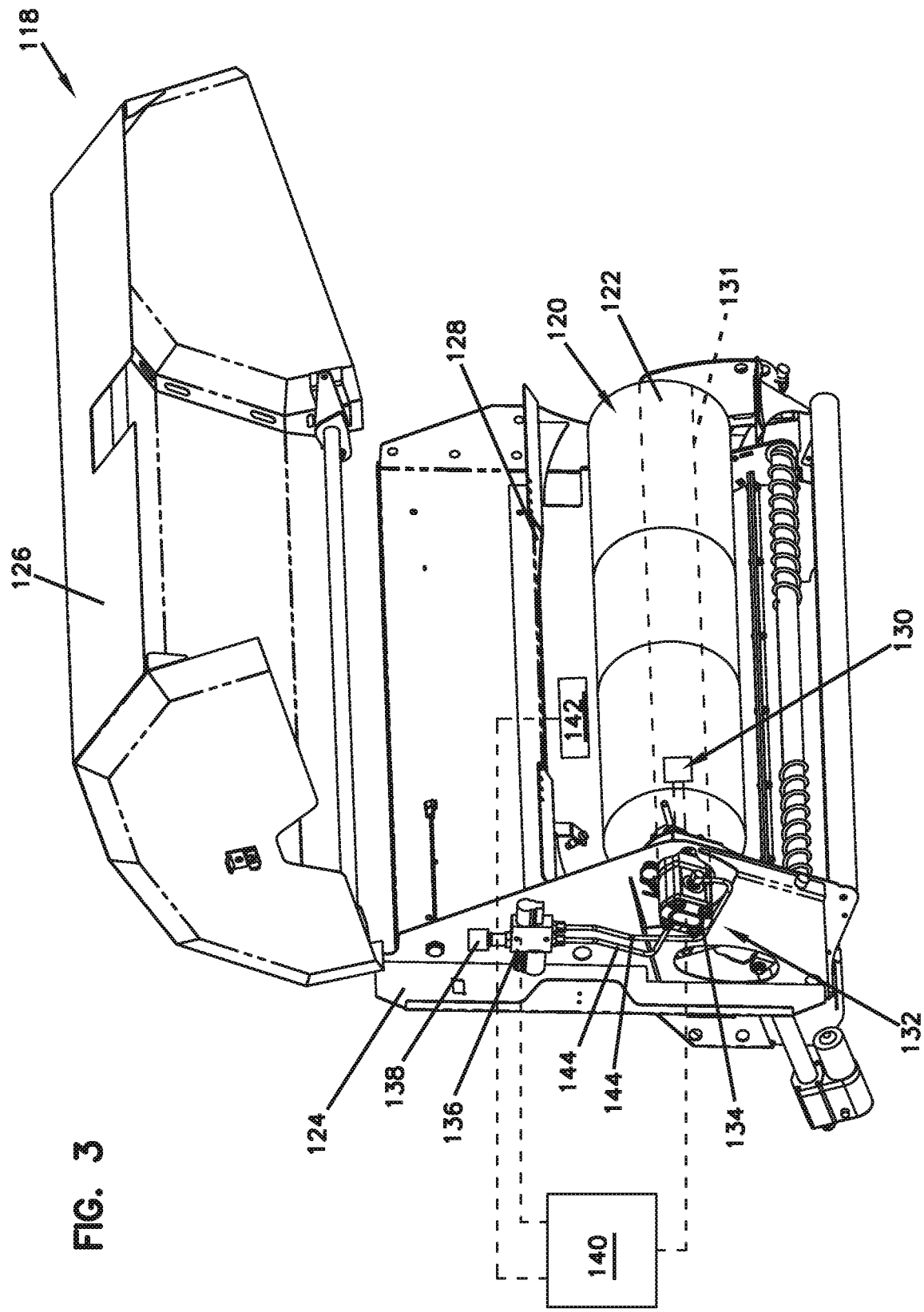
FIG. 3 is a perspective view of a wrapping device for a baler, according to one embodiment of the present disclosure.
Figure 4:
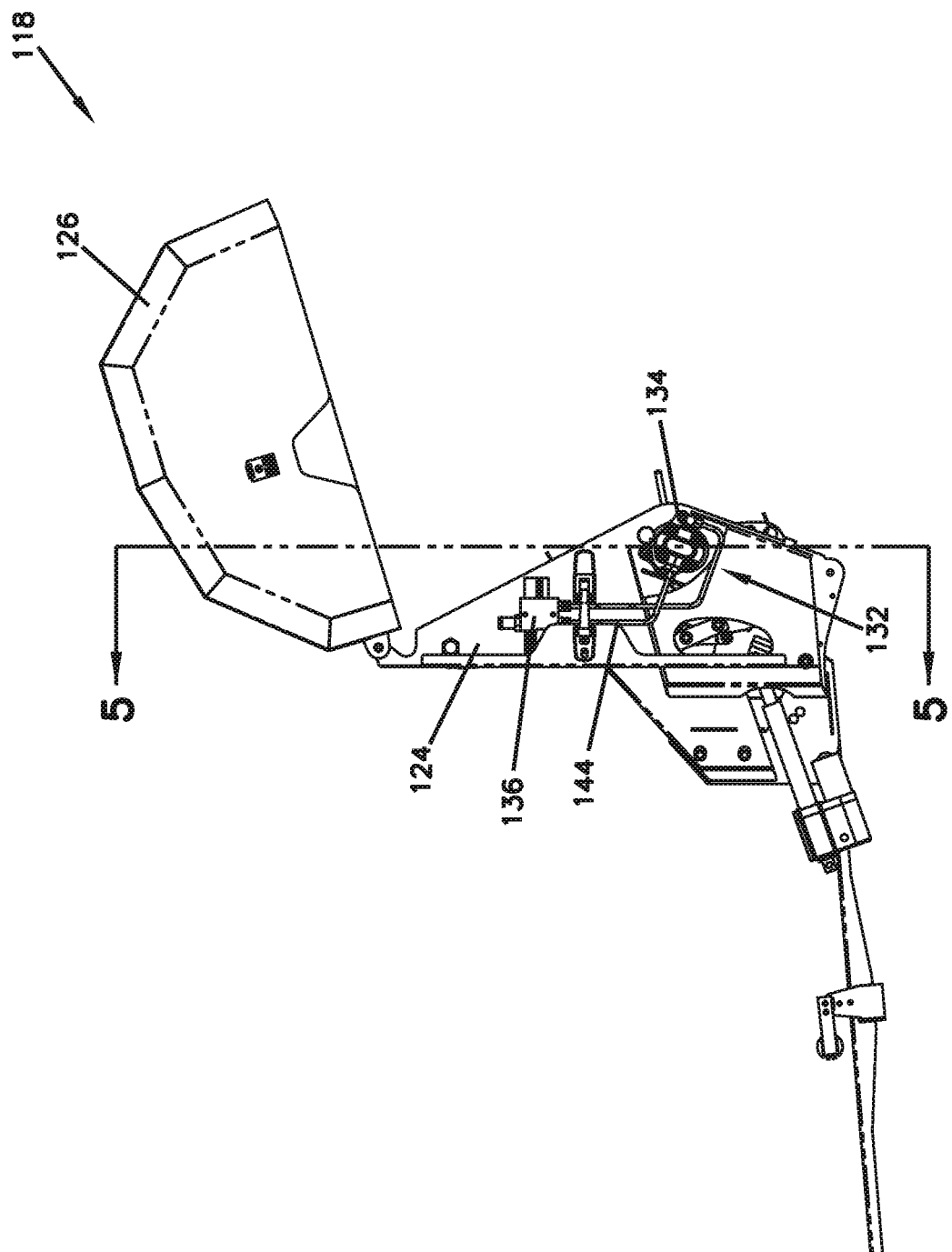
FIG. 4 is a schematic side view of the wrapping device of FIG. 4.

FIGS. 1 and 2 show a schematic side view of a round baler 100. The baler 100 can be towed behind a vehicle via wheels 101 or can be operated as a standalone machine. In one example, the round baler 100 uses an expandable baling chamber 102 which operates by utilizing at least one bale forming belt 104 routed around a series of rollers 106. The baler 100 includes a driving means 108, a pick-up device 110, a single or a plurality of belt tighteners 112, and a lift gate 114.

As material is picked up by the pick-up device 110 and deposited in the baling chamber 102 at an inlet 103, the material is compressed by the bale forming belt 104. Tension is maintained in the bale forming belt 104 by the series of belt tighteners 112 to ensure a properly compressed bale. Once a full bale 116 is formed, as shown in FIG. 2, material inflow ceased and a wrapping operation is commenced by a wrapping device 118. The wrapping device 118 is configured to apply a layer of wrap material 120 to the outer circumference of the completed bale 116. In some examples, the wrap material 120 is dispensed from a wrap material roll 122. In some examples, the wrap material roll 122 can have a diameter between about 4 inches and about 13 inches.

The wrap material 120 can be a variety of materials suitable for retaining the shape of the bale, protecting the bale, and for limiting exposure of the bale to moisture. Rope-like twine, knitted netwrap, plastic or fabric sheets, or film-type sheets are just some examples that are commonly used in the industry as wrap material 120. In some examples, the wrap material 120 is not twine (e.g., may be knitted netwrap, plastic or fabric sheets, or film-type sheets). Once the wrapping operation is completed, the operator ejects the full bale 116 from the baling chamber 102 by opening the lift gate 114. Further details relating to the baling operation within the baling chamber 102 can be found in U.S. Pat. No. 7,181,900, which is hereby incorporated by reference in its entirety.

FIGS. 3-6 show the wrapping device 118. The wrapping device 118 is configured to provide a supply of wrap material 120 to the baling chamber 102. Specifically, the wrapping device 118 includes a frame 124, a cover 126, a storage shelf 128, a wrap material spindle 130, a wrap roll support post 135, and a tension control system 132.

The frame 124 can be mounted to the baler 100. In some examples, the frame 124 is mounted to the lift gate 114 of the baler 100. The cover 126 is pivotable about the frame 124 to selectively give the operator access to an internal area of the wrapping device 118. The frame 124 can further define the storage shelf 128 for storing additional rolls of the wrap material 120.

Figure 5:
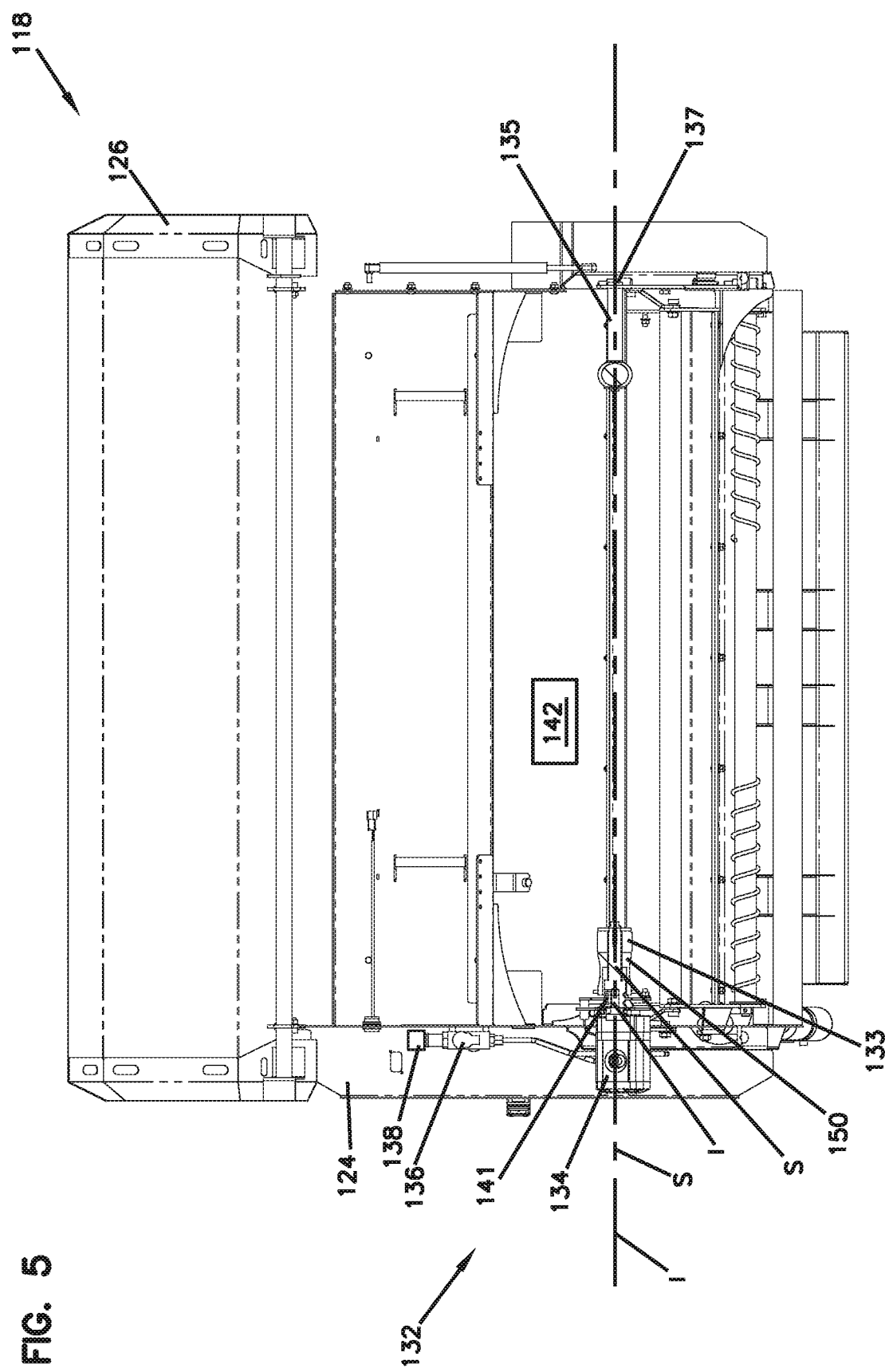
FIG. 5 is a cross-sectional view along line 5-5 of the wrapping device of FIG. 4.
Figure 6:
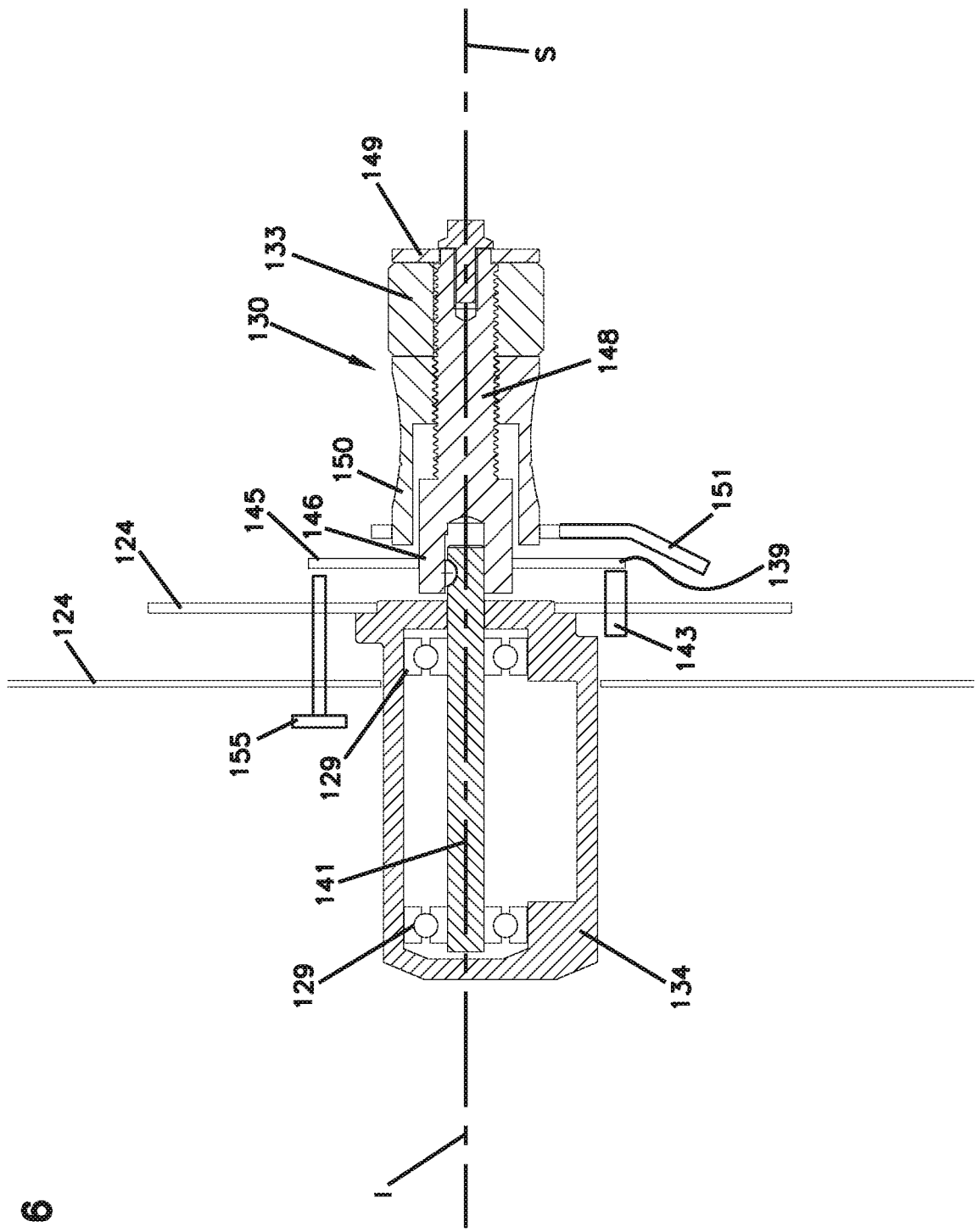
FIG. 6 is a blown-up view of a portion of FIG. 5 showing the wrapping device of FIG. 4.

The wrap material spindle 130 is an extension that is configured to interface with, and selectively attach to, the wrap material roll 122. The wrap material spindle 130 is configured to be coupled to the wrap material roll 122 so that when the wrap material roll 122 rotates, so does the spindle 130. The wrap material spindle 130 is shown in dashed lines in FIG. 3. In some examples, the spindle 130 is configured to be positioned within a hollow central shaft 131 of the wrap material roll 122. In some examples, the spindle 130 can have an expandable component 133 (as shown in FIGS. 5 and 6) that expands within the hollow shaft 131 of the wrap material roll 122 to couple the spindle 130 and the wrap material roll 122 to one another.

The tension control system 132 is configured to control the rotation of the wrap material roll 122 as wrap material 120 is being supplied to the baling chamber 102. In some examples, the tension control system 132 is configured to resist the rotation of the wrap material roll 122 via the spindle 130. In other examples, the tension control system 132 can actively rotate the wrap material roll 122 via the spindle 130.

In some examples, the tension control system 132 is configured to control the rotation of the wrap material roll 122 to maintain substantially consistent tension in the wrap material 120 as the wrap material 120 is supplied to the baling chamber 102. In some examples, the tension control system 132 can automatically or manually control the rotation of the wrap material roll 122. In other examples still, the tension control system 132 controls the rotation of the wrap material roll 122 based on feedback from a sensor(s), predetermined parameters, and/or manual input from the operator. In further examples still, the tension control system 132 is configured to allow the wrap material roll 122 to freely rotate, without providing resistance to the wrap material roll 122.

The tension control system 132 can include a rotary hydraulic device 134, a valve block 136, a hydraulic reservoir 138, and a controller 140. In some examples, the tension control system 132 includes at least one sensor 142 for measuring one or more properties related to the wrap material roll 122.

As used herein, the term "hydraulic" means and includes any system commonly referred to as a hydraulic or pneumatic system, while the term "hydraulic fluid" means and includes any incompressible or compressible fluid that may be used as a working fluid in such a hydraulic or pneumatic system.

The rotary hydraulic device 134 is coupled to the spindle 130 of the wrap material roll 122 and attached to the frame 124. Specifically, the rotary hydraulic device 134 includes an input shaft 141 that is coupled to the spindle 130. In some examples, the rotary hydraulic device is a hydraulic motor primarily designed for converting pressurized fluid flow into rotary power. In other examples, the rotary hydraulic device is a hydraulic pump primarily designed for converting rotary power into pressurized fluid flow. In some examples, the rotary hydraulic device is a hydraulic motor operated as a hydraulic pump.

In some examples, the input shaft 141 of the rotary hydraulic device 134 includes an input shaft longitudinal axis I that is coaxially aligned with a spindle longitudinal axis S of the spindle 130 (shown in FIG. 6). In other examples, the input shaft longitudinal axis I is offset from the spindle longitudinal axis S of the spindle 130.

When the input shaft longitudinal axis I and spindle longitudinal axis S coaxially aligned, because input shaft 141 is coupled to the spindle 130, the input shaft 141 of the rotary hydraulic device 134 rotates at the same rate as the spindle 130, i.e., a rotational 1:1 ratio. In other examples, the input shaft 141 is offset and coupled to the spindle 130. Such offset connection can alter the rotational ratio between the spindle 130 and the input shaft 141. Further, the offset coupling of the input shaft 141 and the spindle 130 can be accomplished via gears, belts, chains, and/or the like. In some examples, a clutch (not shown) can be coupled to and between the spindle 130 and the input shaft 141.

In the depicted examples, the valve block 136 is fluidly connected to the rotary hydraulic device 134 via a pair of hydraulic fluid lines 144. In some examples, the valve block 136 can be mounted to the frame 124. In other examples, the valve block 136 can be contained within the rotary hydraulic device 134. In some examples, the valve block 136 can include at least one valve that is configured to control the hydraulic fluid to or from the rotary hydraulic device 134. In some examples, the hydraulic reservoir 138 is in communication with the valve block 136.

The controller 140, shown schematically, is configured to alter the behavior of the tension control system 132. In some examples, the controller 140 is at least in communication with the valve block 136. In some examples, the controller 140 is in communication with the rotary hydraulic device 134, valve block 136, and sensor 142.

The controller 140 can execute a plurality of software instructions that, when executed by the controller 140, cause the tension control system 132 to implement the methods and otherwise operate and have functionality as described herein. The controller 140 may comprise a device commonly referred to as a microprocessor, central processing unit (CPU), digital signal processor (DSP), or other similar device and may be embodied as a standalone unit or as a device shared with components of the hydraulic system with which the tension control system 132 is employed. The controller 140 may include memory for storing the software instructions, or the tension control system 132 may further comprise a separate memory device for storing the software instructions that is electrically connected to the controller 140, allowing bi-directional communication of the instructions, data, and signals therebetween. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems. The operation of the controller 140 will be discussed in more detail herein with respect to FIGS. 7, 8, 9A, 9B and 9C.

The sensor 142 is configured to output signals corresponding to measurements of the one or more properties of the wrap material roll 122. A communication link (not shown) connects the sensor 142 to the controller 140 for the communication of such output signals to the controller 140, and may utilize wired and/or wireless communication devices and methods for such communication.

The sensor 142 of the tension control system 132 can be positioned in a variety of different locations on the wrapping device 118. In some examples, the sensor 142 is mounted to the frame 124 adjacent the wrap material roll 122. In some examples, the tension control system 132 includes a plurality of sensors 142 in communication with the controller 140. In some examples, the sensor 142 is an ultrasonic sensor that is configured to measure a size (e.g., radius or diameter) of the wrap material roll 122. In some examples, the sensor 142 can be a rotary potentiometer, a weight sensor, an electronic sensor, a proximity sensor, a transducer, an imaging sensor, and/or a mechanical sensor (e.g., a bobbin). It is understood and considered part of this disclosure that there are a variety of methods and types of sensors that may be used to measure one or more properties related to the wrap material roll 122.

In some examples, the sensor 142 can be used to sense the rate of rotation of the wrap material roll 122. The sensor 142 may provide feedback to the controller 140 which can then notify the operator of the status of the wrap material roll 122. Notifications can be in the form of a low roll notification, an active feed notification, a no feed notification or a variety of other notifications.

FIG. 5 shows a cross-sectional schematic view of the rotary hydraulic device 134 and spindle 130. The spindle includes an expandable portion 133, a main shaft 148, an end cap 149, a compression member 150, and a rotation device 151 attached to the compression member. As shown, the input shaft 141 of the rotary hydraulic device 134 is coupled to the main shaft 148 of the spindle 130 so that the input shaft 141 and the main shaft 148 rotate together. In some examples, such coupling can be accomplished using a collar 146 or other similar attachment means.

The input shaft 141 of the rotary hydraulic device 134 is supported within the rotary hydraulic device 134 by a set of bearings 129. In some examples, the input shaft 141 of the rotary hydraulic device 134 is configured to receive a side load. The expandable portion 133 of the spindle 130 can be operated to expand within the hollow shaft 131 of the wrap material roll 122 to create an interference fit between the spindle 130 and the wrap material roll 122. The expandable portion is positioned around the main shaft 148 and between the end cap 149 and the compression member 150.

The compression member 150 includes internal threads that interface with threads located on the main shaft 148 of the spindle 130. In order to cycle the expandable portion 133 between an expanded configuration and a non-expanded configuration, the operator interacts with the rotation device 151. In some examples, the rotation device 151 is an extension that extends away from the compression member 150, such as a handle. In some examples, the rotation device 151 is a plurality of extensions that extend away from the compression member 150. In other examples, the rotation device 151 includes an interface that accepts a tool. For example, the interface can be a flat face and/or a hole. As the rotation device 151 is rotated about the spindle axis S, the compression member 150 is either threaded closer to the end cap 149 or unthreaded away from the end cap 149, resulting in longitudinal relative movement of the compression member 150 with respect to the main shaft 148. When threaded closer to the end cap 149, the compression member 150 compresses the expandable portion between the compression member 150 and the end cap 149, causing it to expand. Alternatively, as the compression member 150 is threaded away from the end cap 149, the expandable portion is uncompressed and therefore is non-expanded. In some examples, the expandable portion 133 is constructed from an elastic material such as rubber.

In some examples, the wrapping device 118 includes a sensing disc 145. The sensing disc 145 is attached to the main shaft 148 of the spindle 130. In the depicted example, a sensor 143 is attached to the frame 124 adjacent the sensing disc 145. The sensor 143 can be configured to sense movement of the sensing disc 145. Such movement and speed can be representative of movement and speed of the spindle 130 and therefore, the movement and speed of a wrap material roll 122 attached to the spindle 130. The sensor 143 is in communication with the controller 140 to provide the controller 140 real-time feedback of when the wrap material roll 122 is rotating so that the controller 140 can alter wrap material tension accordingly. For example, the controller 140 may only start applying wrap material tension at a point in the wrap operation after the wrap material roll 122 has begun rotating. Further, the controller 140 may be configured to apply wrap material tension when the wrap material roll 122 is rotating within a certain speed range.

In some examples, the sensing disc can include at least one indicator 139 so that the sensor 143 can sense rotation of the sensing disc 145. Such indicators 139 can include a paint patch, holes, lobes, projections, or other like features.

The sensing disc 145 can also be configured to selectively interface with a stopping device 155. The stopping device 155 is configured to be selectively movable in contact with the sensing disc 145 to prevent rotation of the sensing disc 145, and thereby the wrap material 122 attached to the spindle 130. The stopping device 155 prevents rotation of the main shaft 148, allowing easier threading or unthreading of the compression member 150 along the main shaft 148 of the spindle 130.

In some examples, the stopping device 155 interfaces with a feature (e.g. a notch, lobe, hole, projection, etc.) on the sensing disc 145 to prevent relative rotation between the sensing disc 143 and the stopping device 145. In some examples, the stopping device 155 is a pin that is connected to the frame 124. In some examples, the stopping device 155 is an aperture in the frame 124 that is configured to receive a projection attached to the sensing disc 145. In other examples still, the sensing disc 145 is longitudinally slidable along the main shaft 148 and can be selectively slid into engagement with the stopping device 155.

The wrapping device 118 also includes the wrap roll support post 135, positioned opposite the spindle 130. The wrap roll support post 135 is configured to be aligned with the spindle longitudinal axis S and configured to support an opposite side of the wrap material roll 122 than the spindle 130. Specifically, the wrap roll support post 135 is sized and shaped to be positioned within the hollow central shaft 131 of the wrap material roll 122.

In some examples, the wrap roll support post 135 can be attached to the frame 124 at a hinge 137. The hinge 137 allows the wrap roll support post 135 to pivot during the unloading and loading of a wrap material roll 122 onto the spindle 130. Specifically, when pivoted, the wrap roll support post 135 is misaligned with the spindle longitudinal axis S.

To load a wrap material roll 122, the wrap roll support post 135 is first pivoted about the hinge 137 so that the wrap roll support post 135 is misaligned with the spindle longitudinal axis S. The hollow central shaft 131 of the wrap material roll 122 is then positioned around the wrap roll support post 135. The wrap roll support post 135 and wrap material roll 122 are then pivoted to be back in line with the spindle longitudinal axis S. Once aligned, the hollow central shaft 131 of the wrap material roll 122 is slid onto the spindle 130, and the expandable portion 133 is compressed and secured to the inside of the hollow central shaft 131.

Alternatively, to load a wrap material roll 122, the wrap roll support post 135 is first pivoted about the hinge 137 away from the longitudinal axis S and the hollow central shaft 131 is placed over the spindle 130. The wrap roll support post 135 is then pivoted to be back in line with the spindle longitudinal axis S, and the wrap material roll 122 is slid over the wrap roll support post 135. Finally, the expandable portion 133 is compressed and secured to the inside of the hollow central shaft 131.

Figure 7:
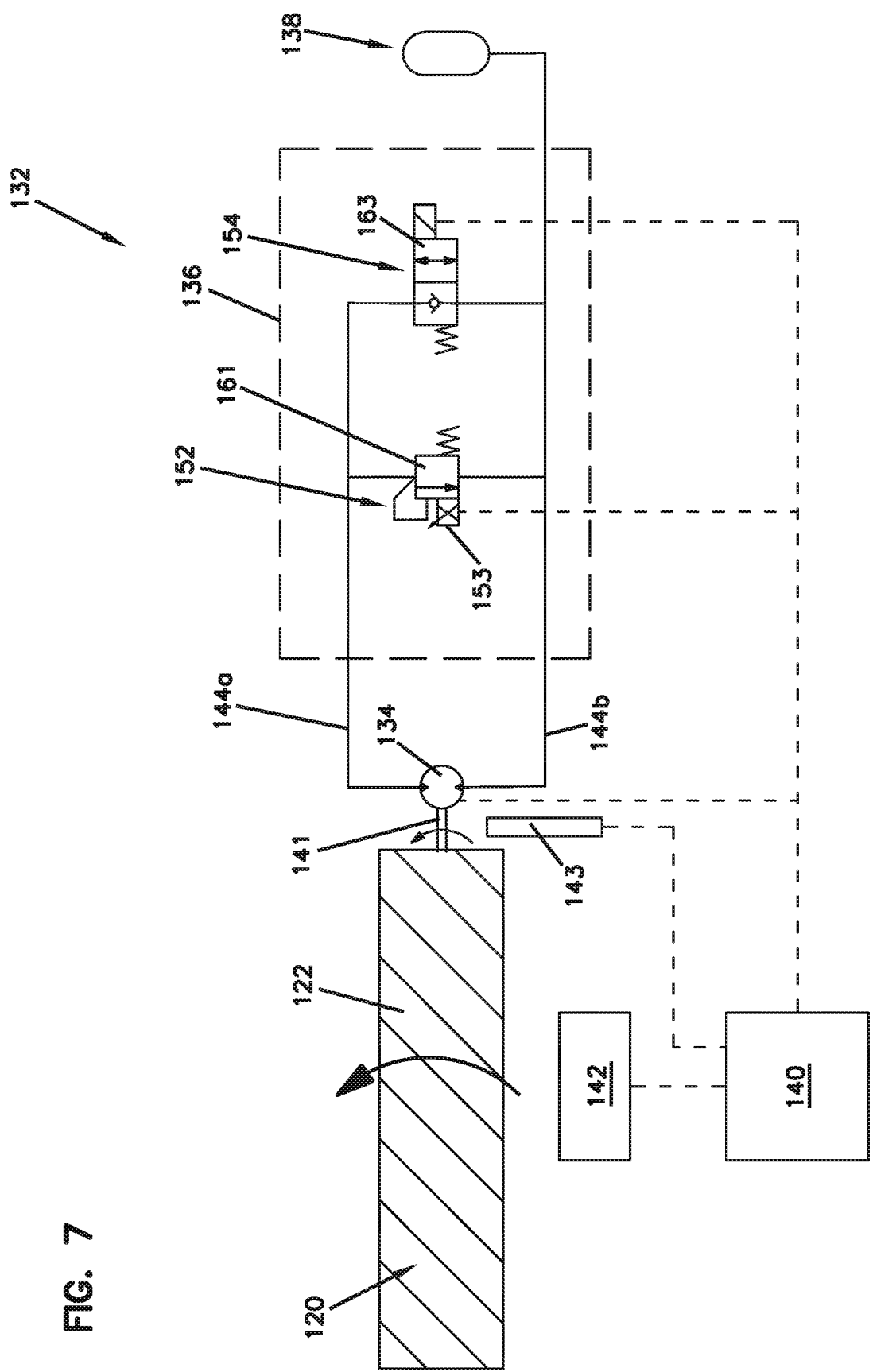
FIG. 7 is a schematic view of a tension control system of the wrapping device of FIG. 4, according to one embodiment of the present disclosure.

FIG. 7 shows a schematic representation of the tension control system 132. As shown, the input shaft 141 of the rotary hydraulic device 134 is connected to the wrap material roll 122 (e.g., via the spindle 130). The rotary hydraulic device 134 is also fluidly connected via hydraulic fluid lines 144a, 144b to the valve block 136, which contains a control valve 152 and a bypass valve 154. Finally, components of the tension control system 132 are all in communication with the hydraulic reservoir 138.

In some examples, the rotary hydraulic device 134 is configured to receive rotational input from the wrap material roll 122 that will cause it to pump fluid toward the valve block 136, specifically toward control valve 152 and bypass valve 154. In some examples, the control valve 152 and/or the bypass valve 154 are contained within the rotary hydraulic device 134. Fluid can then either flow through the control valve 152 and/or through the bypass valve 154 and then be moved through the system 132 via the rotary hydraulic device 134 because the system 132 is a closed system.

In some examples, the rotary hydraulic device 134 has a fixed displacement. In some examples, the fixed displacement of the rotary hydraulic device 134 is between about 25 cubic inches and about 40 cubic inches. In some examples, the fixed displacement of the rotary hydraulic device 134 is between about 30 cubic inches and about 35 cubic inches. In some examples, the fixed displacement of the rotary hydraulic device 134 is between about 33 cubic inches and about 35 cubic inches. In some examples, the rotary hydraulic device 134 is a fixed displacement bidirectional gear motor. In other examples, the rotary hydraulic device 134 has a variable displacement and can be utilized with a traditional non-metered control valve 152.

In some examples, the control valve 152 within the valve block 136 is configured to meter fluid pressure therethrough. Specifically, the control valve 152 is capable of controlling a variable pressure of hydraulic fluid displaced by the rotary hydraulic device 134. In some examples, when the bypass valve 154 is in a closed position, fluid leaving the rotary hydraulic device 134 via line 144a can only travel through the control valve 152. Flow through the control valve 152 occurs when the fluid pressure in the line 144a exceeds a pressure relief setting of the control valve 152. As the pressure setting of the control valve 152 is increased, fluid pressure in line 144a is increased. Such pressure in line 144a must be overcome by the rotary hydraulic device 134, thereby increasing the torque needed to rotate the input shaft 141. Such required increased torque resists the rotation of the spindle 130 and attached wrap material roll 122. By resisting the rotation of the wrap material roll 122 as wrap material 120 is being pulled into the baling chamber 102 and around a bale 116, the wrap material 120 is placed under tension. This resistance to rotation can be used as a braking response to selectively alter the tension in the dispensed wrap material 120 that is being fed into the baling chamber 102. Therefore, to alter the braking response of the tension control system 132, the pressure relief setting of the control valve 152 is manipulated to achieve a desired braking response.

In some examples, the control valve 152 is a proportional pressure relief valve that is powered via an electric solenoid 153 and has a pressure relief setting. In some examples, the control valve 152 can have a spring-loaded internal spool 161 that is configured to have a maximum pressure relief setting when no power is supplied to the control valve 152. To alter the pressure relief setting of the control valve 152, the current supplied to the solenoid 153 can be altered. For example, to decrease the pressure relief setting, the current delivered to the solenoid is increased. In some examples, a Hydraforce® TS10-27 proportional pressure relief valve can be used as the control valve 152. In some examples, the control valve 152 can be operated to have a variable pressure relief setting between about 50 pounds per square inch (psi) and about 3000 psi.

In other examples still, the solenoid 153 is a pulse width modulation solenoid that is cycled between an on and off position at a frequency within a set period of time. The solenoid can create a variable average fluid pressure over time within line 144a by cycling the control valve between open and closed.

In other examples, the control valve 152 within the valve block 136 is configured to meter fluid flow therethrough. Specifically, the control valve 152 includes a variable opening therein to control a variable pressure of hydraulic fluid displaced by the rotary hydraulic device 134. When the bypass valve 154 is in a closed position, fluid leaving the rotary hydraulic device 134 via line 144a can only travel through the control valve 152. In some examples, as the variable opening in the control valve 152 is reduced in size, fluid pressure builds in line 144a due to the restriction. Such pressure in line 144a must be overcome by the rotary hydraulic device 134, thereby increasing the torque needed to rotate the input shaft 141. Such required increased torque resists the rotation of the spindle 130 and attached wrap material roll 122. Therefore, to alter the braking response of the tension control system 132, the variable opening in the control valve 152 is manipulated to allow a desired amount of fluid flow therethrough to achieve a desired resistance. In some examples, the control valve 152 that meters flow can include a plurality of sensors in communication with the controller 140 to monitor flow and pressure through the variable opening of the control valve. In some examples, the control valve 152 can also include a position sensor in communication with the controller 140 to monitor the position of the spool 151.

In other examples, a variable opening of the control valve 152 can be a variable sized opening or one that is opened/closed with a variable time cycle where the valve 152 can be fluctuated between an open state and a closed state in a variable time cycle to create a variable fluid pressure and/or a variable fluid flow.

In further examples, a series of flow restrictions can be used in addition to the control valve 152. In such an example, when flow occurs through the control valve 152, the flow can be routed to a specific fluid path that has one or a plurality of flow restrictions. The controller 140 can then utilize the signal from the sensor to determine which fluid path should be used to achieve proper wrap material tension.

The bypass valve 154, when in an open position 163, is configured to allow the wrap material roll 122 to rotate with minimal resistance from the input shaft 141. When in the open position 163, the bypass valve 154 minimizes pressure in line 144a, thereby lowering the torque required to rotate the input shaft 141 of the rotary hydraulic device 134. At times during the wrapping operation, it is advantageous for the wrap material roll 122 to freely rotate, such as when the operator is installing a wrap material roll 122 to the spindle 130, or at the very beginning of the wrapping operation as wrap material 120 is being fed toward the baling chamber 102. In some example, the bypass valve 154 is a check valve. In other examples, the bypass valve 154 is a powered valve. In other examples, the system 132 does not include the bypass valve 154.

The controller 140 is in communication with the control valve 152, bypass valve 154, rotary hydraulic device 134, sensor 143, and sensor 142. In some examples, the controller 140 can use information received from the sensor 142 to operate some and/or all of the components of the tension control system 132. In one example, the controller 140 receives measurements from the sensor representative of one or more properties of the wrap material roll 122 and uses the measurements to alter the behavior of the control valve 152 to alter the tension applied to the dispensed wrap material 120.

In one example, the sensor 143 is a proximity sensor. In other examples, the sensors can be a mechanical sensor. The sensor 143 can be configured to sense movement of the material roll 122 attached to the spindle 130.

In one example, the sensor 142 can be an ultrasonic sensor that senses the size of the wrap material roll 122 (e.g., a radius or diameter). Generally, as the size of the wrap material roll 122 decreases, the amount of rotational resistance from rotary hydraulic device 134 reduces to maintain constant tension required on the wrap material 120, and therefore the braking response decreases. Specifically, as the size of the wrap material roll 122 decreases, the sensor 142 sends such measurements to the controller 140. The controller 140 then sends signals to the control valve 152 to control the pressure relief setting to correspond with a desired braking response.

In another example, the tension of the wrapping material 120 may be measured by the sensor 142, and the brake response may be varied by the controller 140 based on a predetermined preferred value for wrapping material tension.

In other examples still, the sensors 142, 143 can monitor the wrap material 120 speed for sudden decreases. The controller 140 may identify a sudden decrease in speed by a certain percentage drop of the speed during a set time interval. A sudden decrease in speed correlates in a sudden increase in tension, which increases the likelihood that the wrap material 120 could break. In order to prevent breakage when a decrease in the linear speed of the wrap material 120 is detected, the controller 140 can lessen the braking response (i.e., reduce the pressure setting of the control valve 152) for a predetermined time, and then reset the braking response to maintain adequate tensioning on the wrap material 120.

In other examples, the braking response may be varied by the controller 140 based on a function of the wrap material roll 122 size and the wrap material tension. In some examples, at least one of the sensors 142, 143 may measure the speed of the wrap material 120 before any braking response is applied and compare it to the speed of the wrap material 120 after a braking response has been triggered. In such an example, the controller 140 can use the comparison to create a percentage of wrapping material stretch that is being applied. The controller 140 may then adjust the braking response accordingly to achieve a desired stretch percentage.

In another example, the sensor 142 can be a spring-loaded device (e.g., a spring biased pivoting arm) over which the wrap material 120 passes prior to entering the baling chamber 102. The spring-loaded device may be configured in a variety of ways so that a component (e.g., an arm) deflects as tension is varied on the wrapping material. The controller 140 can be programed so that a predetermined amount of deflection of the spring-loaded component of the sensor 142 equates to ideal tension on the wrap material 120. The controller 140 may then vary the braking response to achieve the desired deflection in the spring-loaded arm and thereby achieve the desired tension in the wrap material 120. Additionally, after the wrap operation has completed, the brake response can be substantially decreased by either reducing the pressure relief setting of the control valve to its widest position, or opening the bypass valve 154. The wrap material roll 122 can be allowed to freely rotate at the end of the wrapping operation to allow the wrap material to back spool slightly before the brake response is reapplied. This can improve the reliably of starting the wrapping material during the next wrapping operation.

In some examples, the controller 140 can be configured so that the operator is able to choose the size of a bale and the number of wraps of wrap material 120 that is to be wrapped around the full bale 116. By knowing the diameter of the full bale 116 and the desired total number of wraps of wrap material 120, the controller 140 can calculate a total length of wrap material 120 to be applied to the bale and use the sensor 142 to monitor the amount of the wrap material 120 that has been dispensed.

In some examples, the controller 140 can be configured so that the operator can override the automatic altering of the wrap material tension via the sensor with an operator entered manual value. In other examples still, the operator can set a desired scaled value of wrap material tension. In such an example, the controller 140 operates to automatically adjust the wrap material 120 tension during a wrap operation and scaling the brake response accordingly to achieve a wrap tension that corresponds with the scaled value input by the operator.

Figure 8:
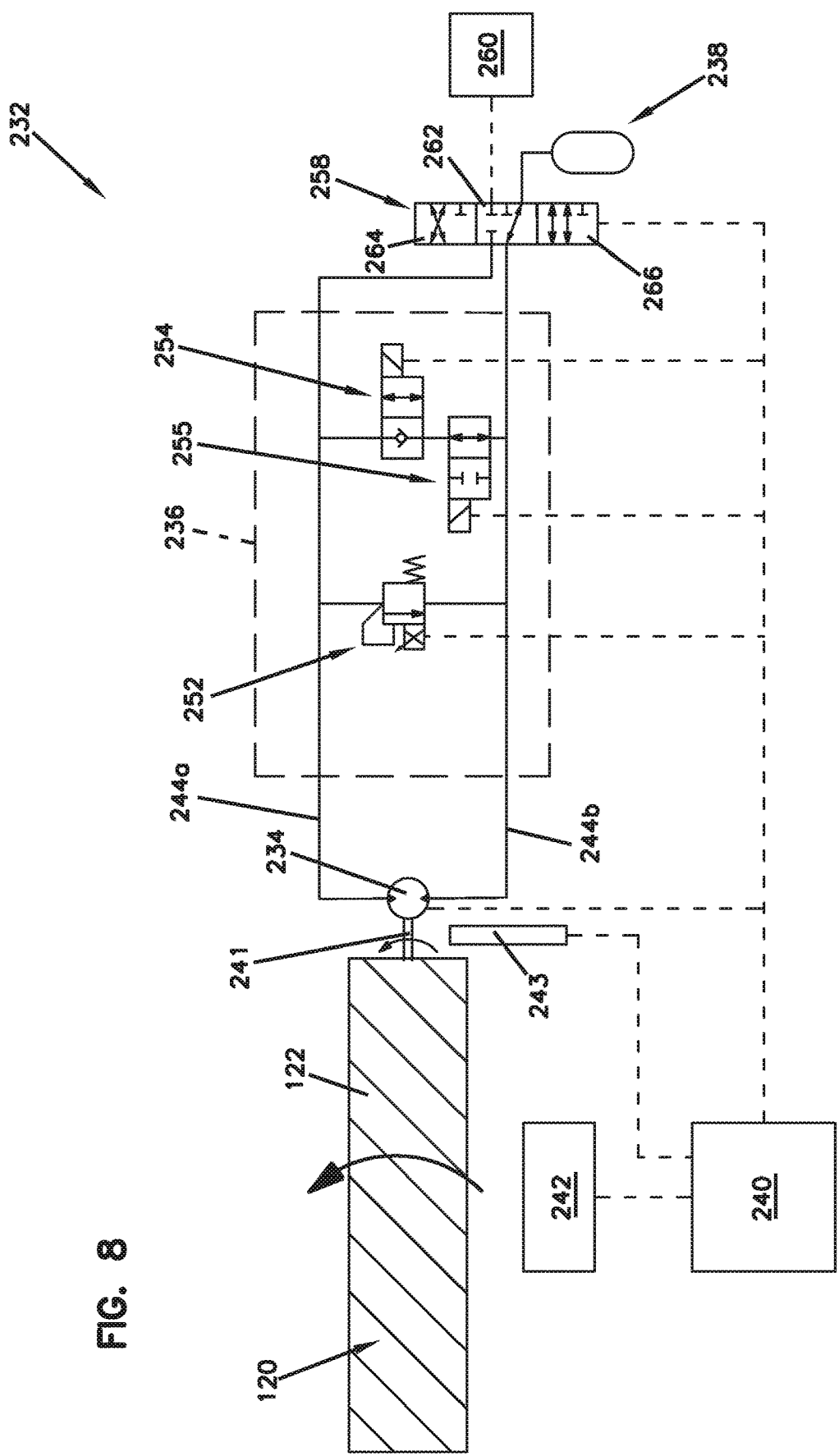
FIG. 8 is a schematic view of an additional tension control system of the wrapping device of FIG. 4, according to one embodiment of the present disclosure.

FIG. 8 shows another example of a tension control system 232, according to principles of the present disclosure. The tension control system 232 is substantially similar to the tension control system 132 described above. In the depicted example, a rotary hydraulic device 234 is fluidly connected to a valve block 236 that includes a control valve 252, a bypass valve 254, and a flow control valve 255. The system 232 also includes a main control valve 258 that connects fluid lines 244a, 244b that facilitates connection with a hydraulic fluid flow source 260. The hydraulic fluid flow source 260 can be a hydraulic system on the baler 100, tractor, or other like machine. In some examples, the hydraulic fluid flow source 260 is a pump, accumulator, or the like.

The main control valve 258 allows fluid to enter the system 232 to provide fluid flow to the rotary hydraulic device 234 to allow the rotary hydraulic device 234 to be operated as a motor and provide powered rotation to the wrap material roll 122. Specifically, the main control valve 258 allows for three operating modes: a normal mode, a powered forward mode; or a powered reverse mode.

In normal mode, the main valve 258 is in a first position 262, and the system 232 operates in a substantially similar fashion to the system 132 described above, thereby receiving no additional flow from the hydraulic fluid flow source 260.

In the powered forward mode, the main valve 258 is in a second position 264, and fluid flow is provided from the hydraulic fluid flow source 260 to the rotary hydraulic device 234 via line 244b to forwardly rotate (dispense wrap material 120) the wrap material roll 122.

In the powered reverse mode, the main valve 258 is in a third position 266, and fluid flow is provided from the hydraulic fluid flow source 260 to the rotary hydraulic device 234 via line 244a to reversely rotate (retract wrap material 120) the wrap material roll 122.

When the rotary hydraulic device 234 is operating as a motor and powering the rotation of the wrap material roll 122, the control valve 252 is closed, and the flow control valve 255 must be closed for circular fluid flow.

Similar to the system 132 described above, a controller 240 and sensors 242, 243 that can be used to automate the operation of the tension control system 232. Specifically, the controller 240 is configured to automate the operation of the system 232 to deliver either a variable braking response via the control valve 252 or a motoring function via valve 258 and flow control valve 255.

Figure 9A:
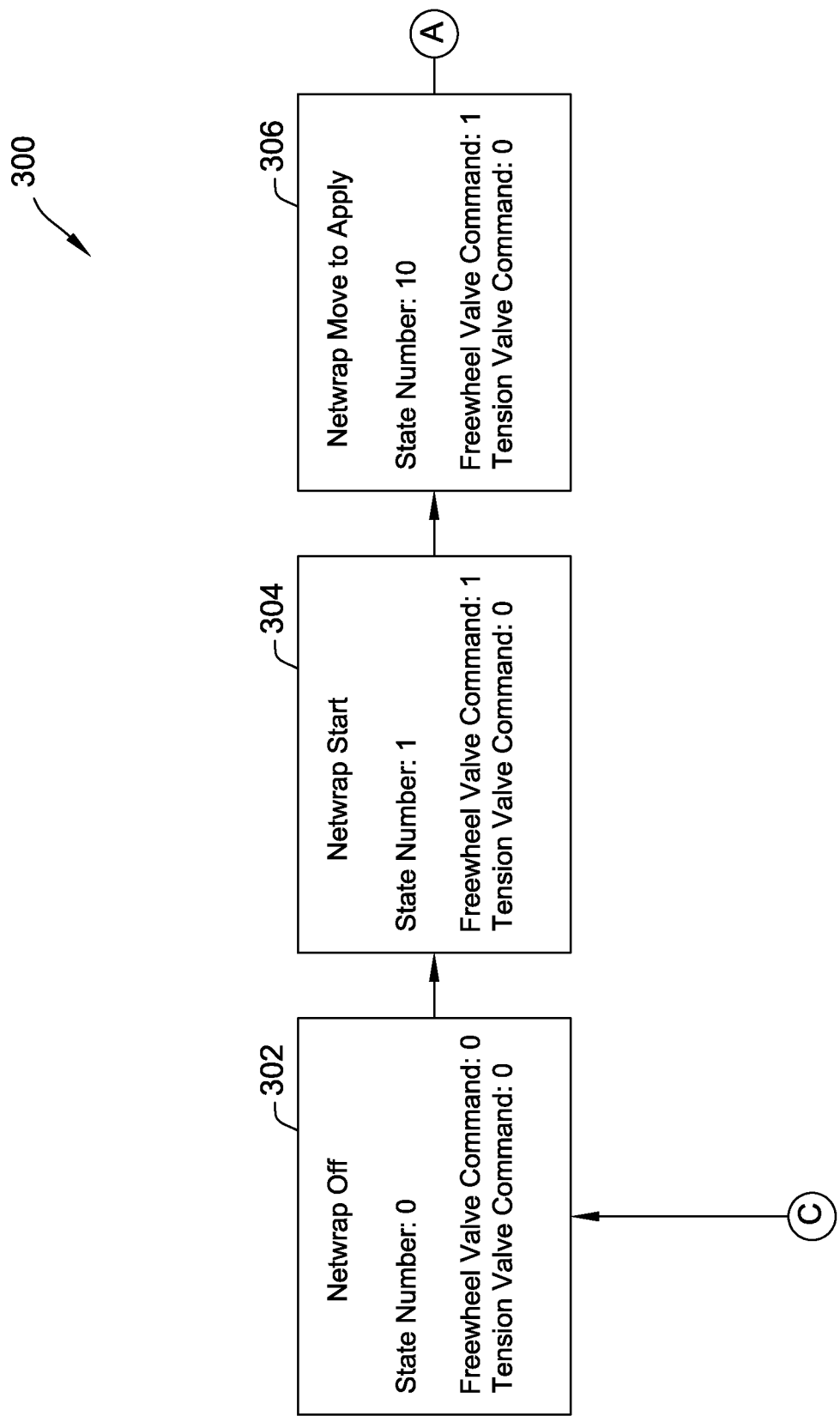
FIGS. 9A, 9B and 9C illustrate a flowchart representation of a method for controlling the tension of a bale wrap material during a bale wrap operation, according to one embodiment of the present disclosure.
Figure 9B:
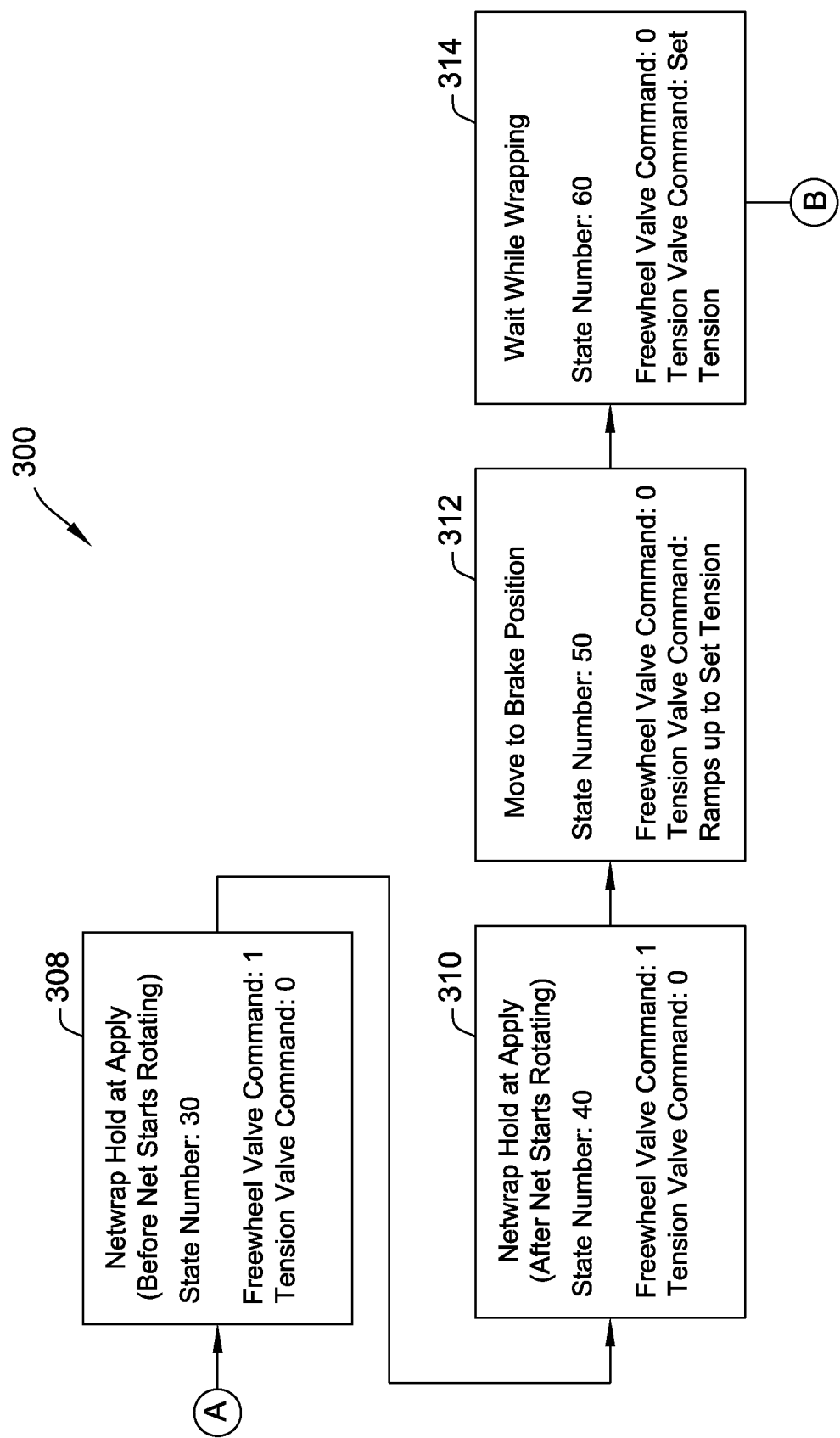
Figure 9C:
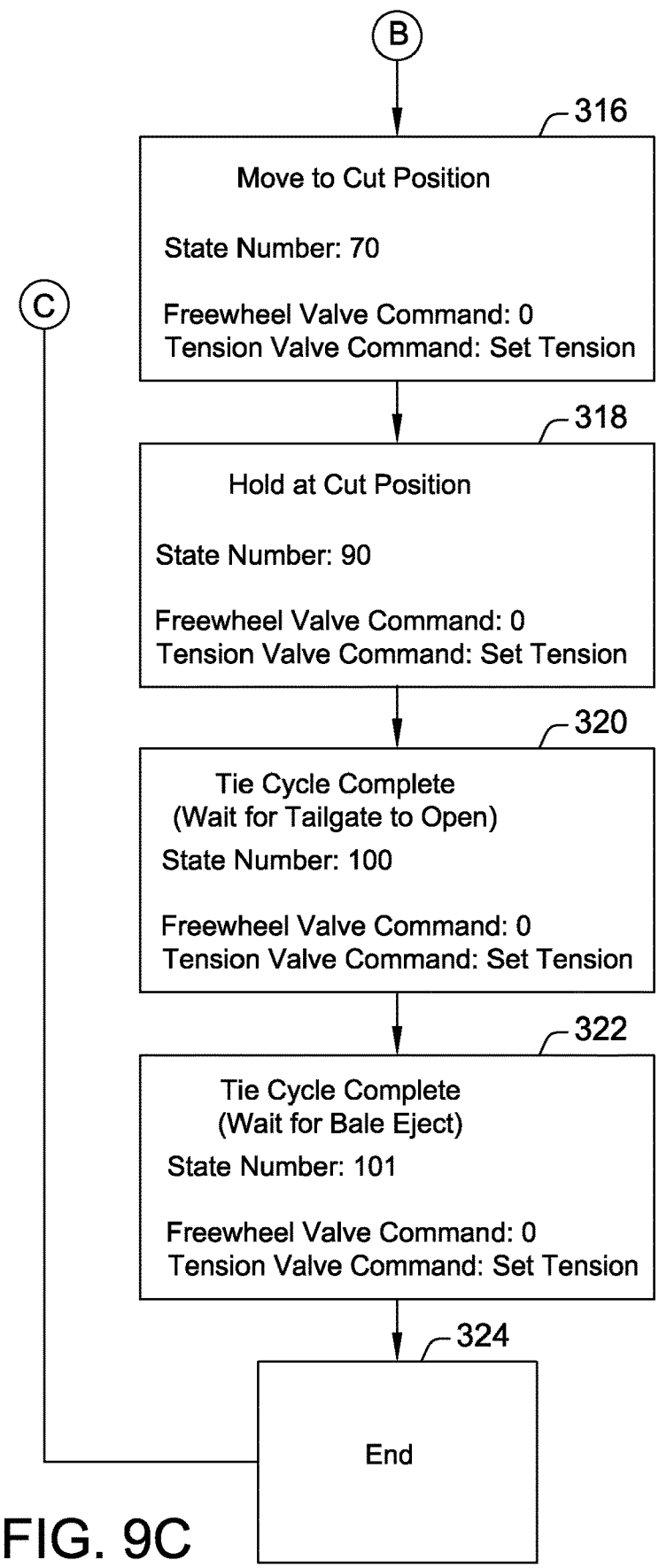

FIGS. 9A, 9B and 9C show a method 300 of controlling the tension of the wrap material 120 during a wrap operation. The method 300 includes a plurality of steps 302-324. At each step of the method 300, the "state number" is representative of the progression of the wrap operation. For example, as the method 300 progresses, each additional step will have a state number that increases sequentially. For example, when the method starts, the state number is 0 and when the method ends, the state number is 100, similar to a percentage.

Further, each step includes a freewheel value command and a tension valve command. The freewheel value command corresponds to the bypass valve 154, 254 above and has an arbitrary value of 1 or 0. The value of 1 corresponds to the controller 140, 240 opening the bypass valve 154, 254 to allow the wrap material roll 122 to rotate with minimal resistance. The value of 0 corresponds to the controller 140, 240 closing the bypass valve 154, 254 so as to provide a motoring or braking response to the wrap material roll 122.

The tension value command is representative of the amount of tension being applied to the wrap material 120, and is therefore representative of a braking response. The tension value command can include an arbitrary value that increases as the braking response increases, and therefore wrap material tension is increased. For example, the tension value command can have a range between 0 and 10,000, where 0 is representative of no wrap material tension and 10,000 is representative of maximum wrap material tension.

At step 302, no wrap material 120 is being delivered to the baling chamber 102, therefore the wrap operation is not operating and includes a state number equal to 0, a freewheel value command equaling 0, and a tension value command equaling 0. At step 304, the wrap operation starts and includes a state number equal to 1, a freewheel value command equaling 1, and a tension value command equaling 0. At steps 304, 306, and 308, the wrap material roll 122 is prepared to start feeding into the bale chamber 102, but is not yet rotating. At steps 304, 306, and 308, to prepare for feeding, the wrap material roll 122 is allowed to rotate with minimal resistance to aid in initial wrap material 120 feeding.

At step 310, the wrap material roll 122 starts feeding into the baling chamber 102 and is allowed to rotate with minimal resistance to aid in initial wrap material 120 feeding. As noted above, this corresponds to opening the bypass valve 154, 254.

At step 312, the wrap operation has a state number equal to 50, a freewheel value command equaling 0, and a tension value command that is configured to apply a set tension at a ramped rate. Said another way, at step 312, a braking response is implemented by the controller 140, 240 by closing the bypass valve 154, 254 and operating the control valve 152, 252 to resist the rotation of the wrap material roll 122 based on feedback from sensor 142, 242, sensor 143, 243 or another input. At step 312, the braking response to achieve a desired wrap material tension is applied over a set time interval (i.e., ramped) to ensure that the wrap material 120 does not break when a braking response is implemented. In some examples, the braking response is ramped over an adjustable time interval that can be altered based on signals from the sensor 142, 242, sensor 143, 243 input from the user, or a predetermined value programmed into the controller 140, 240. In some examples, the time interval is about 0.5 seconds.

At step 314, the bale 116 is wrapped with the wrap material 120, and the wrap operation has a state number equal to 60, a freewheel value command equaling 0, and a tension value command that is equal to a set tension. The set tension is a tension that the controller 140, 240 has determined is appropriate based on feedback from the sensor 142, 242, input from the operator, state number of the step, an/or other factors. In some examples, the set tension can be a tension based on a single measurement from the sensor 142, 242 before the method 300 begins. For example, the sensor 142, 242 can sense the size of the wrap material roll 122 and determine a set tension that is to be applied for a single wrap operation. In other examples, the set tension can be varied throughout the wrap operation, specifically during step 314. In other examples, the set tension can be based on the speed of the wrap material roll 122 as it rotates. As described above, this speed can be sensed by sensor 143, 243. The controller 140, 240 can alter the set tension during the wrap operation based on a variety of different factors such as measurements from the sensor 142, 242, measurements from the sensor 143, 243, and/or operator input.

At step 316, the wrapping of the bale 116 is complete, and the wrap material 120 is cut. The wrap operation has a state number equal to 70, a freewheel value command equaling 0, and a tension value command that is equal to a set tension that is determined by the controller 140, 240.

At steps 318 and 320, the wrap material 120 has been cut, and the wrapped bale 116 is ready to be ejected from the baling chamber 102. The wrap operation has a state number equal to 80, a freewheel value command equaling 0, and a tension value command that is equal to a set tension that is determined by the controller 140, 240.

At step 322, the wrapped bale 116 is ejected from the baling chamber 102, and the wrap operation has a state number equal to 80, a freewheel value command equaling 0, and a tension value command that is equal to a set tension that is determined by the controller 140, 240. Once ejected, at step 324, the wrap operation is complete. The method 300 is then repeated when a new bale 116 is formed.

The above specification, examples and data provide a complete description of the manufacture and use of the composition of the invention. In addition, various aspects of the preceding disclosure are applicable to both fixed chamber round balers and variable chamber round balers. Since many embodiments of the invention can be made without departing from the spirit and scope of the invention, the invention resides in the claims hereinafter appended.

EXAMPLES

Illustrative examples of the bale wrap tensioning system disclosed herein are provided below. An embodiment of the bale wrap tensioning system may include any one or more, and any combination of, the examples described below.

Example 1 is a bale wrap tensioning system. The bale wrap tensioning system includes a spindle that can be operatively coupled to a wrap material supply roll. The bale wrap tensioning system includes a rotary hydraulic device that has a rotatable input shaft. The input shaft is coupled to the spindle for rotation with the wrap material supply roll. The bale wrap tensioning system including a control valve that is operable to control a variable pressure of hydraulic fluid displaced by the rotary hydraulic device. The bale wrap tensioning system includes a controller for adjusting the control valve to alter the variable pressure of the hydraulic fluid displaced by the rotary hydraulic device.

In Example 2, the subject matter of Example 1 is further configured to include a sensor that is operable to measure one or more properties related to the wrap material supply roll. The sensor is operable to output signals corresponding to measurements of the one or more properties of the wrap material supply roll.

In Example 3, the subject matter of Example 2 is further configured such that the sensor is operable to sense a radius of the wrap material supply roll.

In Example 4, the subject matter of Example 2 is further configured such that the sensor is an ultrasonic sensor.

In Example 5, the subject matter of Example 2 is further configured such that the controller automatically adjusts the control valve based at least in part on the output signals of the sensor.

In Example 6, the subject matter of Example 2 is further configured such that the controller automatically adjusts the control valve based at least in part on the output signals from the sensor representative of a radius of the wrap material supply roll.

In Example 7, the subject matter of Example 1 is further configured such that the input shaft includes an input shaft longitudinal axis. The spindle includes a spindle longitudinal axis, and the input shaft longitudinal axis and the spindle longitudinal axis are co-axially aligned.

In Example 8, the subject matter of Example 1 is further configured such that the input shaft includes an input shaft longitudinal axis. The spindle includes a spindle longitudinal axis, and the input shaft longitudinal axis and the spindle longitudinal axis are offset.

In Example 9, the subject matter of Example 1 is further configured such that the control valve is a proportional relief valve having a pressure operating range between about 75 psi and about 3000 psi.

In Example 10, the subject matter of Example 1 is further configured such that the rotary hydraulic device has a fixed displacement.

In Example 11, the subject matter of Example 10 is further configured such that the rotary hydraulic device has a fixed displacement between about 30 cubic inches and about 35 cubic inches.

In Example 12, the subject matter of Example 1 is further configured such that the controller automatically adjusts the control valve to alter the variable pressure of the hydraulic fluid displaced by the rotary hydraulic device.

In Example 13, the subject matter of Example 1 is further configured to include a bypass valve fluidly connected to the rotary hydraulic device and the control valve. The bypass valve is positioned downstream from the pump and in parallel with the control valve. The bypass valve is operable to allow hydraulic fluid to freely bypass the control valve when in an open position.

In Example 14, the subject matter of Example 1 is further configured such that the rotary hydraulic device is fluidly connected to a hydraulic system having at least one hydraulic fluid flow source, wherein the rotary hydraulic device is operable to rotate the spindle.

Example 15 is a bale wrap tensioning system. The bale wrap tensioning system includes a spindle that can be operatively coupled to a wrap material supply roll. The spindle includes a spindle longitudinal axis. The bale wrap tensioning system includes a rotary hydraulic device having a fixed displacement between about 25 cubic inches and about 40 cubic inches. The rotary hydraulic device includes a rotatable input shaft coupled to the spindle for rotation with the wrap material supply roll. The bale wrap tensioning system includes a control valve positioned downstream from the rotary hydraulic device. The control valve is a proportional pressure relief valve that has a pressure setting used to control a variable pressure of hydraulic fluid displaced by the rotary hydraulic device. The bale wrap tensioning system includes a controller for automatically adjusting the pressure setting of the control valve to provide a braking response to the spindle.

In Example 16, the subject matter of Example 15 is further configured to include a sensor that is operable to measure one or more properties related to the wrap material supply roll, and the sensor is operable to output signals corresponding to measurements of the one or more properties of the wrap material supply roll. The controller automatically adjusts the control valve based at least in part on the output signals of the sensor.

In Example 17, the subject matter of Example 15 is further configured to include a bypass valve fluidly connected to the rotary hydraulic device and control valve. The bypass valve is positioned downstream from the rotary hydraulic device and in parallel with the control valve. The bypass valve is operable to allow hydraulic fluid to freely bypass the control valve when in an open position.

Example 18 is a bale wrap tensioning system. The bale wrap tensioning system includes a spindle that can be operatively coupled to a wrap material supply roll. The spindle includes a spindle longitudinal axis. The bale wrap tensioning system includes a rotary hydraulic device having a fixed displacement between about 25 cubic inches and about 40 cubic inches. The rotary hydraulic device includes a rotatable input shaft coupled to the spindle for rotation with the wrap material supply roll. The bale wrap tensioning system includes a control valve positioned downstream from the rotary hydraulic device. The control valve is a proportional pressure relief valve that has a pressure setting used to control a variable pressure of hydraulic fluid displaced by the rotary hydraulic device. The bale wrap tensioning system includes a controller for automatically adjusting the pressure setting of the control valve to provide a braking response to the spindle.

In Example 19, the subject matter of Example 18 is further configured such that the input shaft includes an input shaft longitudinal axis. The input shaft longitudinal axis and the spindle longitudinal axis are co-axially aligned.

In Example 20, the subject matter of Example 18 is further configured to include a sensor that is operable to measure one or more properties related to the wrap material supply roll. The sensor is operable to output signals corresponding to measurements of the one or more properties of the wrap material supply roll. The controller automatically adjusts the control valve based at least in part on the output signals of the sensor.

In Example 21, the subject matter of Example 18 is further configured to include a bypass valve fluidly connected to the rotary hydraulic device and control valve. The bypass valve is positioned downstream from the rotary hydraulic device and in parallel with the control valve. The bypass valve is operable to allow hydraulic fluid to freely bypass the control valve when in an open position.

In Example 22, the subject matter of Example 18 is further configured such that the rotary hydraulic device has a fixed displacement between about 30 cubic inches and about 35 cubic inches.

In Example 23, the subject matter of Example 18 is further configured such that the rotary hydraulic device is a hydraulic motor.

In Example 24, the subject matter of Example 18 is further configured such that the rotary hydraulic device is a hydraulic pump.

Example 25 is a bale wrap tensioning system. The bale wrap tensioning system includes a rotary hydraulic device that has a rotatable input shaft. The bale wrap tensioning system includes an extension coupled to the input shaft of the rotary hydraulic device. The extension includes a compressible portion that is selectively expandable to fix the extension to a bale wrap material roll.

In Example 26, the subject matter of Example 25 is further configured such that the rotary hydraulic device is a hydraulic motor.

In Example 27, the subject matter of Example 25 is further configured such that the rotary hydraulic device is a hydraulic pump.

In Example 28, the subject matter of Example 25 is further configured such that the extension includes a main shaft and a compression member. The compression member is movable with respect to the main shaft, and the compression member is configured to compress the compressible portion of the extension.

In Example 29, the subject matter of Example 25 is further configured such that the extension includes a sensing disc attached thereto. The sensing disc includes at least one rotation indicator.

In Example 30, the subject matter of Example 29 is further configured to include a sensor to sense the rotation of the sensing disc via the rotation indicator.

In Example 31, the subject matter of Example 25 is further configured such that the rotary hydraulic device includes a housing attached to a frame, the bale wrap tensioning system further comprising a stopping device that is configured to prevent rotation of the extension with respect to the frame.

We claim:

1. A bale wrap tensioning system comprising:
   a spindle that can be operatively coupled to a wrap material supply roll;
   a rotary hydraulic device having a rotatable input shaft, the input shaft being coupled to the spindle for rotation with the wrap material supply roll;
   a control valve operable to control a variable pressure of hydraulic fluid displaced by the rotary hydraulic device, the control valve being a proportional relief valve having a pressure operating range between about 75 psi and about 3000 psi; and
   a controller for adjusting the control valve to alter the variable pressure of the hydraulic fluid displaced by the rotary hydraulic device.

2. The bale wrap tensioning system of claim 1, further comprising a sensor operable to measure one or more properties related to the wrap material supply roll, the sensor being operable to output signals corresponding to measurements of the one or more properties of the wrap material supply roll.

3. The bale wrap tensioning system of claim 2, wherein the sensor is operable to sense a radius of the wrap material supply roll.

4. The bale wrap tensioning system of claim 2, wherein the controller automatically adjusts the control valve based at least in part on the output signals of the sensor.

5. The bale wrap tensioning system of claim 1, wherein the input shaft includes an input shaft longitudinal axis, wherein the spindle includes a spindle longitudinal axis, and wherein the input shaft longitudinal axis and the spindle longitudinal axis are co-axially aligned.

6. The bale wrap tensioning system of claim 1, wherein the input shaft includes an input shaft longitudinal axis, wherein the spindle includes a spindle longitudinal axis, and wherein the input shaft longitudinal axis and the spindle longitudinal axis are offset.

7. The bale wrap tensioning system of claim 1, wherein the rotary hydraulic device has a fixed displacement between about 25 cubic inches and about 40 cubic inches.

8. The bale wrap tensioning system of claim 1, wherein the rotary hydraulic device is fluidly connected to a hydraulic system having at least one hydraulic fluid flow source, and wherein the rotary hydraulic device is operable to rotate the spindle.

9. The bale wrap tensioning system of claim 1, further comprising an extension coupled to the input shaft of the rotary hydraulic device, the extension including a compressible portion that is selectively expandable to attach the extension to a bale wrap material roll.

10. A bale wrap tensioning system comprising:
a spindle that can be operatively coupled to a wrap material supply roll;
a rotary hydraulic device having a rotatable input shaft, the input shaft being coupled to the spindle for rotation with the wrap material supply roll;
a control valve operable to control a variable pressure of hydraulic fluid displaced by the rotary hydraulic device;
a bypass valve fluidly connected to the rotary hydraulic device and the control valve, the bypass valve being positioned downstream from the rotary hydraulic device and in parallel with the control valve, wherein the bypass valve is operable to allow hydraulic fluid to freely bypass the control valve when in an open position; and
a controller for adjusting the control valve to alter the variable pressure of the hydraulic fluid displaced by the rotary hydraulic device.

11. The bale wrap tensioning system of claim 10, further comprising a sensor operable to measure one or more properties related to the wrap material supply roll, the sensor being operable to output signals corresponding to measurements of the one or more properties of the wrap material supply roll.

12. A bale wrap tensioning system comprising:
a spindle that can be operatively coupled to a wrap material supply roll, the spindle including a spindle longitudinal axis;
a rotary hydraulic device having a rotatable input shaft, the input shaft being coupled to the spindle for rotation with the wrap material supply roll, the input shaft including an input shaft longitudinal axis, wherein the input shaft longitudinal axis and the spindle longitudinal axis are co-axially aligned;
a control valve positioned downstream from the rotary hydraulic device, the control valve being operable to control a variable pressure of hydraulic fluid displaced by the rotary hydraulic device; and
a controller for automatically adjusting the control valve to alter a pressure relief setting of the control valve to provide a braking response to the spindle.

13. The bale wrap tensioning system of claim 12, further comprising a sensor operable to measure one or more properties related to the wrap material supply roll, the sensor operable to output signals corresponding to measurements of the one or more properties of the wrap material supply roll, wherein the controller automatically adjusts the control valve based at least in part on the output signals of the sensor.

14. The bale wrap tensioning system of claim 12, further comprising a bypass valve fluidly connected to the rotary hydraulic device and control valve, the bypass valve being positioned downstream from the rotary hydraulic device and in parallel with the control valve, wherein the bypass valve is operable to allow hydraulic fluid to freely bypass the control valve when in an open position.

15. The bale wrap tensioning system of claim 12, wherein the rotary hydraulic device has a fixed displacement between about 25 cubic inches and about 40 cubic inches, and wherein the control valve is a proportional pressure relief valve.

16. The bale wrap tensioning system of claim 12, further comprising an extension coupled to the input shaft of the rotary hydraulic device, the extension including a compressible portion that is selectively expandable to attach an extension to a bale wrap material roll.

17. A bale wrap tensioning system comprising:
a rotary hydraulic device having a rotatable input shaft;
an extension coupled to the input shaft of the rotary hydraulic device, the extension including:
a compressible portion that is selectively expandable to attach the extension to a bale wrap material roll; and
a sensing disc attached to the extension, wherein the sensing disc includes at least one rotation indicator.

18. The bale wrap tensioning system of claim 17, wherein the rotary hydraulic device is at least one of a hydraulic motor and a hydraulic pump.

19. The bale wrap tensioning system of claim 17, wherein the extension includes a main shaft and a compression member, wherein the compression member is movable with respect to the main shaft, and wherein the compression member is configured to compress the compressible portion of the extension.

20. The bale wrap tensioning system of claim 17, further comprising a sensor to sense the rotation of the sensing disc via the rotation indicator.

21. A bale wrap tensioning system comprising:
a rotary hydraulic device having a rotatable input shaft and a housing attached to a frame;
an extension coupled to the input shaft of the rotary hydraulic device, the extension including a compressible portion that is selectively expandable to attach the extension to a bale wrap material roll; and
a stopping device that is configured to prevent rotation of the extension with respect to the frame.

22. The bale wrap tensioning system of claim 21, wherein the rotary hydraulic device is at least one of a hydraulic motor and a hydraulic pump.

* * * * *